(12) United States Patent
Beall

(10) Patent No.: US 7,465,687 B2
(45) Date of Patent: Dec. 16, 2008

(54) TOUGH CORDIERITE GLASS-CERAMICS

(75) Inventor: George Halsey Beall, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 38 days.

(21) Appl. No.: 11/445,049

(22) Filed: May 31, 2006

(65) Prior Publication Data

US 2007/0281850 A1 Dec. 6, 2007

(51) Int. Cl.
C03C 10/08 (2006.01)
C03C 10/02 (2006.01)
C03C 10/04 (2006.01)

(52) U.S. Cl. .................. 501/9; 501/5; 501/10
(58) Field of Classification Search ............ 501/5, 501/9, 10
See application file for complete search history.

(56) References Cited

U.S. PATENT DOCUMENTS

| 2,920,971 | A | * | 1/1960 | Stookey | 501/2 |
| 3,940,255 | A | | 2/1976 | Harrington et al. | |
| 4,304,603 | A | | 12/1981 | Grossman et al. | |
| 5,001,086 | A | | 3/1991 | Carrier et al. | |
| 5,532,194 | A | * | 7/1996 | Kawashima | 501/9 |
| 6,171,988 | B1 | | 1/2001 | Fasano et al. | |
| 6,300,263 | B1 | * | 10/2001 | Merkel | 501/9 |
| 6,495,480 | B1 | * | 12/2002 | Goto | 501/4 |

* cited by examiner

Primary Examiner—Karl E Group
(74) Attorney, Agent, or Firm—Walter M. Douglas

(57) ABSTRACT

An internally nucleated, toughened cordierite glass-ceramic is disclosed. The cordierite glass-ceramic has good oxidation resistance and fracture toughness and coefficient of thermal expansion rivaling that of silicon nitride. The glass-ceramic may be cast as a liquid. Annealing produces a material of high crystallinity combining high hardness, high Young's modulus, good thermal stability, high strength, low density and good dielectric properties. The glass-ceramic comprises interlocking crystalline phases dominated by cordierite and a second phase having an elongated or acicular structure. A third phase may comprise a crystalline ceramic that promotes acicularity of the second phase. The third phase is preferably capable of twinning.

6 Claims, 1 Drawing Sheet

TOUGH CORDIERITE GLASS-CERAMICS

FIELD OF THE INVENTION

The invention relates to a toughened glass-ceramic compound comprising cordierite.

BACKGROUND OF THE INVENTION

In high temperature application, crystalline materials often have superior resistance to thermal deformation compared to their glassy counterparts. Crystalline articles are often produced by sintering. Sintering has certain disadvantages, including void creation and the need for pressing. In contrast, glassy articles may be cast in a nearly void-free state. Unfortunately, glassy materials can thermally deform well below their theoretical melting point.

Prior art teaches that crystalline grains can be annealed from an initially glassy material, thereby forming a glass-ceramic. Glass-ceramics can have improved resistance to thermal deformation compared to the glass. The glass is first shaped, usually above the liquidus temperature, and then annealed above a nucleation temperature. The fluid nature of the glass above its liquidus can permit it to be shaped by casting. The nucleation temperature is a temperature at which crystals begin to form and grow within the glass. The selected nucleation temperature should be below a temperature at which the glass would thermally deform. During annealing, crystalline grains nucleate, begin to grow, and ultimately comprise a majority of the material. High melting point compounds, such as titanium dioxide, can facilitate nucleation. Below its melting temperature, a crystal typically has significantly lower thermal deformation than a corresponding glass. Glass-ceramics have been used in a variety of applications where resistance to thermal deformation is an issue.

One such glass-ceramic composition includes a predominately crystalline phase comprising cordierite. Cordierite, a magnesium aluminum silicate, was described by S. D. Stookey in U.S. Pat. No. 2,920,971, and may be used in refractory applications. Cordierite glass-ceramics have good hardness and resistance to thermal deformation, but they can suffer from a high coefficient of thermal expansion (CTE) and have only average fracture toughness. For example, one cordierite glass-ceramic has a fracture toughness of 2.2 MPa·m$^{0.5}$ and an average CTE of $57 \times 10^{-7}$/° C. over the temperature range from 25-1000° C. Poor fracture toughness permits cracks to form and propagate, which can cause an article to shatter or break under stress. A high CTE decreases resistance to thermal shock. Low fracture toughness and high CTE limit the utility of cordierite glass-ceramics.

Silicon nitride, $Si_3N_4$, has been used in applications requiring lower CTE and higher fracture toughness. Silicon nitride has a CTE of about $30 \times 10^{-7}$/° C. and a fracture toughness around 6 MPa·m$^{0.5}$. Silicon nitride also has better high temperature capabilities than most metals combining high strength, creep resistance, and oxidation resistance. These properties have allowed silicon nitride to replace metals in turbine and reciprocating engines, and as engine components, bearings and cutting tools. In addition, its low thermal expansion coefficient provides good thermal shock resistance compared with most ceramic materials. Negatively, silicon nitride can be difficult to produce as a fully dense material (often requiring hot pressing), does not readily sinter, may oxidize under certain conditions, and cannot be heated over 1850° C. because it dissociates into silicon and nitrogen. These deficiencies cause silicon nitride components to be expensive, thereby limiting the applications using silicon nitride components.

A need exists for a replacement material to silicon nitride. The material should be relatively inexpensive and easy to produce. Preferably, it should be amenable to molding and should combine low CTE with high fracture toughness.

SUMMARY OF THE INVENTION

The present invention describes an internally nucleated cordierite glass-ceramic. The cordierite glass-ceramic combines good fracture toughness with low CTE. Additionally, the present invention can be cast as a liquid, but after annealing it is substantially crystalline, and has high hardness, high Young's modulus, good thermal stability, high strength, low density and good dielectric properties.

The cordierite glass-ceramic of the present invention has a microstructure comprising interlocking crystalline phases dominated by a first phase consisting essentially of elongated cordierite grains and a second phase having an elongated or acicular structure. A third phase may also be present and may comprise a crystalline ceramic capable of twinning. The energy associated with twinning can further increase fracture toughness.

The glass-ceramic of the present invention is directed to an internally nucleated cordierite glass-ceramic. The cordierite glass-ceramic combines high fracture toughness in the range of 2.5 to 6.0 MPa·m$^{0.5}$; low thermal expansion coefficient in the range of $20-50 \times 10^{-7}$/° C. in the temperature range 25-1000° C.; high hardness with a Knoop value greater than 800; high Young's Modulus with a value greater than 10 GPa; thermal stability to a temperature of 1200° C. and above; high strengths generally above 200 MPa; low density from about 2.5-2.9 g/cc; and good dielectric properties with high resistivity, low dielectric constant and loss tangent. The invention is further directed to a cordierite glass-ceramic where high fracture toughness is achieved by producing a microstructure of interlocking crystal phases in which cordierite predominates and where at least one phase is highly elongated or acicular. Optionally, an additional phase is desirable that is capable of lamellar twinning, for example without limitation, enstatite ($MgSiO_3$) and/or anorthite ($CaAlSi_2O_8$). Twinning is known to enhance fracture toughness.

In another embodiment, the cordierite glass-ceramic of the present invention has a CTE of less than $35 \times 10^{-7}$/° C. and a fracture toughness about up to 6.0 MPa·m$^{0.5}$. The low CTE results in improved thermal shock resistance. Higher fracture toughness lowers rates of crack initiation and propagation, thereby reducing risks of fracture. The low CTE and increased fracture toughness of cordierite glass-ceramics of the present invention are comparable to silicon nitride. Advantageously, cordierite glass-ceramics may be precision cast from a fluid glassy state, do not require hot pressing and, compared to silicon nitride, have lower densities and superior oxidation resistance.

DETAILED DESCRIPTION OF THE INVENTION

Figure 1:
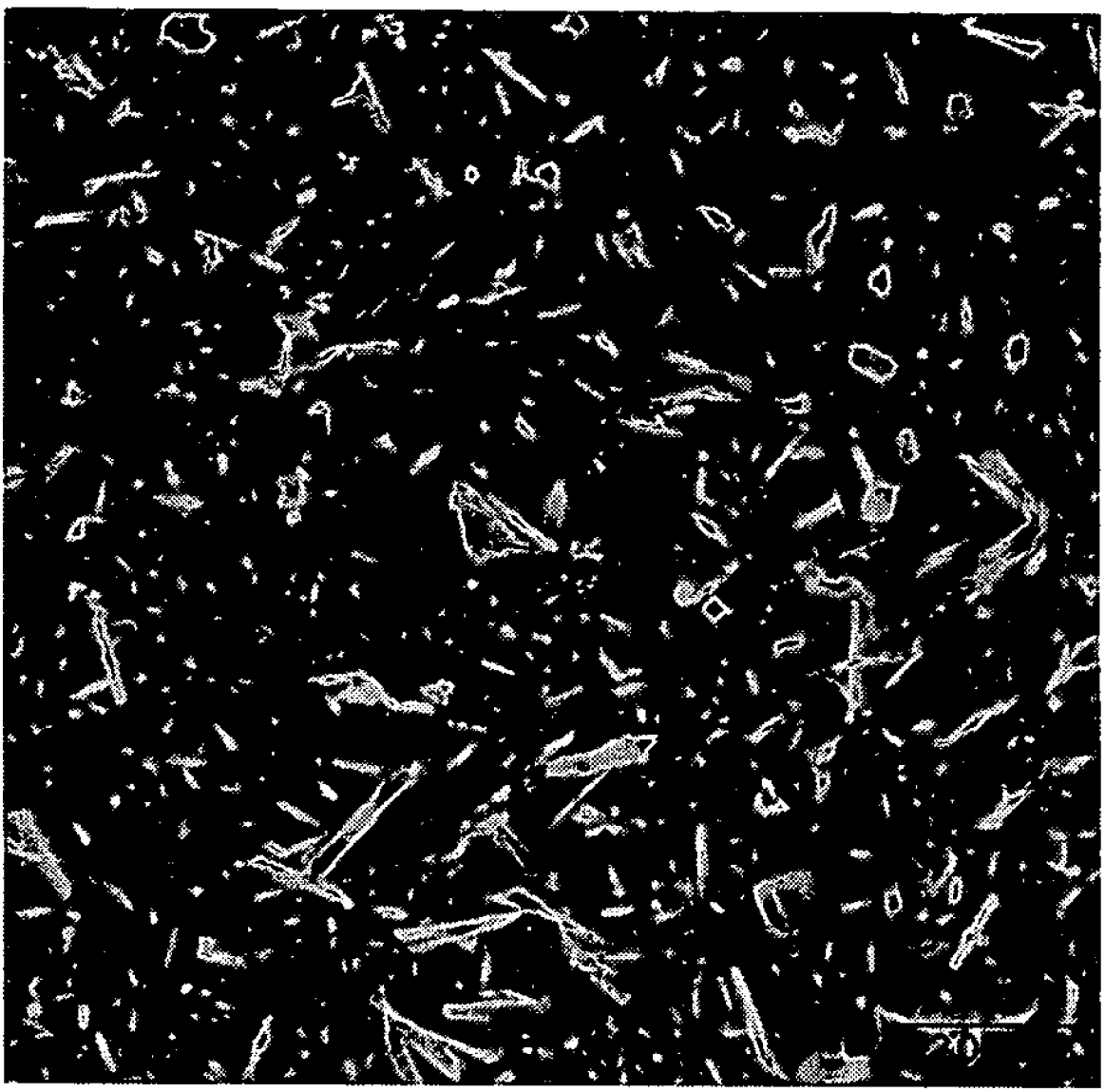
FIG. 1 shows a microstructure of the present invention.

A toughened, low CTE cordierite glass-ceramic includes a plurality of phases at least one of which is acicular. A glass-ceramic includes any material that is formed when a substantially glassy material is annealed at elevated temperature to produce a substantially crystalline material. Annealing induces nucleation of one or more crystalline phases. Nucleation may be accelerated by seeding the glass with high melting point compounds such as titanium dioxide. Annealing is completed when the intended level of crystallinity is reached, typically in excess of eighty percent and more typically greater than ninety percent.

The glass-ceramic of the present invention includes a plurality of crystalline phases. Importantly, any residual glass must not form a continuous phase throughout the material. To this end, crystallinity should be at least about 85% of the volume and preferably more than 90% crystalline. A typical toughened, low CTE cordierite glass-ceramic will have residual glass of less than 5% by volume. The crystalline phases include at least two interlocked phases.

A first crystalline phase comprises elongated grains of cordierite. A second crystalline phase is acicular and includes titanates, such as, for example magnesium titanates, aluminum titanates or combinations thereof. Optionally, a third phase may be present and preferably includes ceramic compounds capable of lamellar twinning. Twinning ceramic compounds include enstatite (MgSiO3) and plagioclase feldspars, such as anorthite ($CaAl_2Si_2O_8$). FIG. 1 shows a micrograph of such a glass ceramic of the present invention, including dark crystals of hexagonal cordierite, white crystals of acicular magnesium aluminum titanate, and grey crystals of anorthite.

The glass-ceramic comprises from 50-80 volume percent cordierite. Advantageously and unlike silicon nitride, cordierite is inherently resistant to oxidation because it is already an oxide. The cordierite phase includes a hexagonal crystal structure of 6/m 2/m 2/m. Cordierite grains should have an aspect ratio of at least 2:1 and preferably at least about 5:1. The elongated structure may facilitate interlocking with other crystal grains. Furthermore, elongated cordierite grains may permit the second phase to grow along the elongated cordierite grain boundaries, thereby increasing the acicularity of the second phase.

The glass-ceramic comprises from 8-20 volume percent of an acicular second phase. During annealing of the glass, second phase crystallization begins around 850° C. culminating in cordierite formation near 1100° C. Further annealing permits the second phase to grow along cordierite grain boundaries. The second crystalline phase should have an aspect ratio of at least 5:1. Acicularity as high as 20:1 has been observed. No theoretical upper limit of acicularity is expected. The measured acicularity will obviously be lower than the actual acicularity unless the second phase falls along the plane of the micrograph. The acicular structure of second phase grains permits such grains to interact with a larger number of other phases or grains. The second phase comprises compounds that inherently grow crystals in acicular, lath-like morphologies. Compounds include, for example, titanates of magnesium and aluminum. Other suitable compounds are known to those skilled in the art. Fluidizing the glass during the annealing process may facilitate acicularization. For example, a low-silica glass can have a steep viscosity versus temperature curve that permits crystal growth in a preferred direction. Orienting the acicular phase can result in a glass-ceramic with substantial mechanical or electrical anisotropy, which may be desirable depending on the application.

The glass-ceramic may include a third crystalline phase. The third phase may be up to 20 volume percent of the glass-ceramic and is preferably at least about 10 volume percent. Advantageously, the third crystalline phase increases acicularity of the second phase. Without intending to be bound by this explanation, a third phase may improve acicularity for two reasons. First, glass-ceramics including above about 90% cordierite tend to produce cordierite crystals with aspect ratios less than 2:1. The blocky, short grain boundary, cordierite grains physically restrict elongated growth of the second phase. Second, high cordierite glasses include a substantial amount of alumina. High-alumina glasses do not allow solubility of as much titania as do glasses lower in alumina. Therefore, less acicular titanate can form. Also, premature phase separation and opalization can occur, so that benefits of the second phase are impaired. Inclusion of the third phase increases the aspect ratio of cordierite crystals and hinders phase separation of titanates.

The third phase comprises crystalline, ceramic compounds that permit acicular growth of the second phase. Preferably, the third phase has the capacity for lamellar twinning. Such ceramics twin by slipping along parallel twin planes. Twinning dissipates energy and can increase fracture toughness. The glass-ceramic may comprise up to 20% by volume of the third crystalline phase. Twinning ceramics include plagioclase feldspars, such as anorthite, Sr-feldspar, Ba-feldspar and pyroxenes such as enstatite, and aluminous enstatite. Depending on the application, the feldspar should have little or no sodium compounds. Sodium-containing feldspars can harm dielectric properties, microwave transparency, and slow crystallization during annealing thereby causing higher residual glass.

It is contemplated that the third phase may also include, in addition to, or as an alternative to, the lamellar twinning phase, a crystalline phase selected from the group consisting of forsterite, fluormica, fluoramphibole, norbergite, spinel, sapphirine, mullite and xonotlite. These crystals phases can be included as means to enhance the toughness of the overall glass-ceramic. In particular, the following toughness enhancement mechanisms are contemplated/theorized: (1) the forsterite, fluoramphibole, norbergite, mullite and xonotlite phases enhance toughness due the presence of blade-like crystals; (2) the spinel and sappharine crystal phases enhance toughness due the high modulus of the crystal phase which is effective to deflect fractures; and (3) the fluormica crystal phase typically exhibits good cleavage which in turn enhances the toughness of the glass-ceramic.

The glass-ceramic may be made from a composition comprising, in weight percent, 35-50% $SiO_2$, 10-35% $Al_2O_3$, 10-25% MgO, 7-20% $TiO_2$, up to 5% CaO, and up to 10% SrO, and up to 5% F, where the sum of CaO and SrO is at least 0.5%. The composition is made into a glass and formed into a desired shape. Conveniently, additives may be added to facilitate processing so that the composition includes up to 5 glass-ceramic of the present invention had a nearly 50% reduction in CTE while improving fracture toughness by over 70%.

The following Table 1 gives further examples of representative compositions according to the invention. Compositional information is in weight percent and is, as batched, unless otherwise indicated.

TABLE 1

|   | A | B | C | D | E* | F | G | H* | I | J | K |
|---|---|---|---|---|----|---|---|----|---|---|---|
| $SiO_2$ | 42.6 | 43.9 | 45.4 | 46.7 | 45.0 | 43.5 | 42.7 | 44.5 | 44.3 | 43.6 | 45.4 |
| $Al_2O_3$ | 21.4 | 20.7 | 25.1 | 25.0 | 28.3 | 31.7 | 29.9 | 28.9 | 25.7 | 25.0 | 18.9 |
| MgO | 18.8 | 22.8 | 17.9 | 16.5 | 14.1 | 12.1 | 12.2 | 14.5 | 15.0 | 16.5 | 21.7 |
| CaO | 0.0 | 1.2 | 3.9 | 1.8 | 2.0 | 3.0 | 0.0 | 2.0 | 2.0 | 2.0 | 2.0 |
| SrO | 8.0 | 1.7 | 0.0 | 0.0 | 0.0 | 0.0 | 5.5 | 0.0 | 0.0 | 0.0 | 0.0 |
| F | 4.0 | 3.1 | 1.5 | 0.0 | 0.0 | 0.0 | 0.0 | 0.0 | 0.0 | 0.0 | 0.0 |
| $TiO_2$ | 7.4 | 7.8 | 9.8 | 9.7 | 9.6 | 9.7 | 9.7 | 9.5 | 13.0 | 12.9 | 12.0 |
| $Na_2O$ |  |  |  | 1.1 |  |  |  |  |  |  |  |
| heat treatment: ° C. - hours |  |  |  |  |  |  |  |  |  |  |  |
| 950-4 | | | | | | | | | | | |
| 800-2 | | | | | | | | | | | |
| 1100-4  1100-10 | | | 1200-10 | 1175-10 | 1200-10 | | | | | | |
| CTE (25-1000° C. × $10^{-7}$) |  |  |  |  | 30.1 | 27.1 |  | 30.0 |  |  |  |
| Knoop |  |  |  |  | 855 | 852 |  |  |  |  |  |
| Toughness $MPa·m^{0.5}$ |  |  | 2.5 |  | 3.8 | 2.8 |  |  |  |  |  |
| Density |  |  |  | 2.764 |  | 2.63 |  |  |  |  |  |

*Composition, as analyzed wt. % BaO, MnO, FeO, CoO, ZnO, $As_2O_3$, $Sb_2O_3$, $B_2O_3$, $Na_2O$, and $K_2O$). The formed shape is annealed from 1100-1300° C. for a sufficient time to achieve the desired crystallinity. A typical annealing time is around 10 hours. Crystallinity usually exceeds 85%. Annealing produces a glass-ceramic comprising a discontinuous glass phase and a plurality of ceramic phases, including cordierite, a titanate, and optionally a twinning ceramic. The glass-ceramic can have a modulus of rupture of 40,000 psi, which is more than 50% greater than standard cordierite glass-ceramics. The glass-ceramic also has a CTE of less than $35 \times 10^{-7}$/° C. and a fracture toughness up to about 6.0 $MPa·m^{0.5}$.

The glass-ceramic of the present invention may be formed into any number of articles. The glass-ceramic is especially adapted to articles requiring low CTE, good fracture toughness, or oxidation resistance. One such article is a radome. The inherent oxidation-resistance of cordierite glass-ceramic permits its use where silicon nitride would oxidize. Further, cordierite glass-ceramics have typical densities from 2.63-2.77 g/ml compared to a silicon nitride density of about 3.30 g/ml. Articles consisting essentially of the toughened cordierite glass-ceramic will have lower mass than the same silicon nitride articles.

EXAMPLE 1

A mixture was made consisting essentially of 45 wt. % silica, 28 wt. % alumina, 14 wt. % magnesia, 2 wt. % calicia and 10 wt. % titania. The mixture was heated to form a clear, amber-colored glass and cast into a shape. The shape was first annealed for 2 hours at 800° C. The shape was further annealed for 10 hours at 1200° C. until a crystallinity of 95 vol. % was achieved. The resultant glass-ceramic had a CTE of $30 \times 10^{-7}$/° C. and a fracture toughness of 3.8 $MPa·m^{0.5}$. Prior art cordierite glass-ceramic have a CTE of $55 \times 10^{-7}$/° C. and a fracture toughness of 2.2 $MPa·m^{0.5}$. The cordierite Obviously, numerous modifications and variations of the present invention are possible. It is, therefore, to be understood that within the scope of the following claims, the invention may be practiced otherwise than as specifically described. While this invention has been described with respect to certain preferred embodiments, different variations, modifications, and additions to the invention will become evident to persons of ordinary skill in the art. All such modifications, variations, and additions are intended to be encompassed within the scope of this patent, which is limited only by the claims appended hereto.

What is claimed:

1. A cordierite glass-ceramic comprising at least three phases including:
    a) 50-80 vol. % of a first phase consisting essentially of cordierite having an aspect ratio of at least 2:1;
    b) 8-20 vol. % of a second phase consisting essentially of titanate having an aspect ratio of at least 5:1; and
    c) up to 20 vol. % of a third phase selected from a group consisting of anorthite, enstatite, aluminous enstatite, forsterite, fluormica, fluoramphibole, norbergite, Sr-feldspar, Ba-feldspar, spinel, sapphirine, mullite and xonotlite.

2. The cordierite glass-ceramic of claim 1, wherein the first phase has an aspect ratio of at least 5:1.

3. The cordierite glass-ceramic of claim 1, wherein the glass-ceramic comprises from 10-20 vol. % of the third phase.

4. A glass-ceramic having a CTE from $20-50 \times 10^{-7}$/° C. in the temperature range 25-300° C. and a fracture toughness from 2.5 to 6.0 $MPa.m^{0.5}$, the glass-ceramic formed from a composition comprising, in weight percent:

| $SiO_2$ | 35-50% |
| $Al_2O_3$ | 10-35% |
| MgO | 10-25% |
| $TiO_2$ | 7-20% |

-continued

| | |
|---|---|
| CaO | up to 5% |
| SrO | up to 10% |
| F | up to 5% | provided that the sum of CaO and SrO comprises at least 0.5%, and wherein the glass-ceramic includes a microstructure comprising interlocking and acicular first and second crystal phases; and wherein the glass-ceramic includes a third crystal phase selected from the group consisting of forsterite, fluormica, fluoramphibole, norberaite, spine, sapphirine, mullite and xonotlite.

5. The glass-ceramic of claim 4, wherein the second phase comprises a titanate selected from a group consisting of magnesium titanate, aluminum titanate and combinations thereof 6. The glass-ceramic of claim 4, wherein the glass-ceramic further includes a crystal phase comprising a twinning ceramic compound selected from a group consisting of anorthite, Sr-feldspar, Ba-feldspar, enstatite, and aluminous enstatite.

* * * * *